(12) United States Patent
Suh et al.

(10) Patent No.: US 12,062,823 B2
(45) Date of Patent: Aug. 13, 2024

(54) METHOD AND SYSTEM FOR DIAGNOSING FAILURE OF TEMPERATURE SENSOR FOR FUEL CELL

(71) Applicants: Hyundai Motor Company, Seoul (KR); Kia Motors Corporation, Seoul (KR)

(72) Inventors: Kyung Won Suh, Seoul (KR); Jae Yeong Yoo, Gyeonggi-Do (KR); Seong Cheol Jeong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 595 days.

(21) Appl. No.: 16/022,805

(22) Filed: Jun. 29, 2018

(65) Prior Publication Data

US 2019/0190045 A1  Jun. 20, 2019

(30) Foreign Application Priority Data

Dec. 18, 2017  (KR) .......................... 10-2017-0174067

(51) Int. Cl.
  *H01M 8/04664* (2016.01)
  *G01K 15/00* (2006.01)
  *H01M 8/0432* (2016.01)
  *H01M 8/04537* (2016.01)

(52) U.S. Cl.
  CPC ...... *H01M 8/04686* (2013.01); *G01K 15/007* (2013.01); *H01M 8/04365* (2013.01); *H01M 8/04559* (2013.01); *H01M 8/04589* (2013.01); *G01K 2205/00* (2013.01)

(58) Field of Classification Search
  CPC .......... H01M 8/04365; H01M 8/04686; G01K 15/007
  See application file for complete search history.

(56) References Cited

U.S. PATENT DOCUMENTS

| | | | | |
|---|---|---|---|---|
| 5,401,589 A * | 3/1995 | Palmer | ................... | H01M 8/04 429/513 |
| 2003/0017375 A1* | 1/2003 | Kanno | .............. | H01M 8/04029 429/438 |

(Continued)

FOREIGN PATENT DOCUMENTS

| | | |
|---|---|---|
| KR | 10-2011-0138443 A | 12/2011 |
| KR | 20120032360 A | 4/2012 |

OTHER PUBLICATIONS

Fuel Cell Technologies Office Fuel Cells Fact Sheet, Nov. 2015, pp. 1-2.*

(Continued)

*Primary Examiner* — Jonathan G Jelsma
(74) *Attorney, Agent, or Firm* — Fox Rothschild LLP

(57) ABSTRACT

A method and a system for diagnosing a failure of a temperature sensor for a fuel cell are provided. The method includes calculating a heating value that is generated at a fuel cell stack during a predetermined diagnosis time and then calculating a temperature variation of the fuel cell stack from the calculated heating value. A failure of a temperature sensor configured to measure a temperature of the fuel cell stack is then detected based on the calculated temperature variation of the fuel cell stack.

5 Claims, 3 Drawing Sheets

(56) References Cited

U.S. PATENT DOCUMENTS

| | | | | |
|---|---|---|---|---|
| 2009/0035613 A1* | 2/2009 | Chikugo | ........... | H01M 8/04029 |
| | | | | 429/430 |
| 2013/0323539 A1* | 12/2013 | Furusawa | ............ | H01M 8/0258 |
| | | | | 429/9 |
| 2016/0079621 A1* | 3/2016 | Kawahara | ......... | H01M 8/04768 |
| | | | | 429/429 |

OTHER PUBLICATIONS

Office Action dated Oct. 25, 2022 in Korean Application No. 10-2017-0174067.
Office Action dated Nov. 7, 2022 in Chinese Application No. 201810818264.6.

* cited by examiner

METHOD AND SYSTEM FOR DIAGNOSING FAILURE OF TEMPERATURE SENSOR FOR FUEL CELL

CROSS REFERENCE TO RELATED APPLICATION

The present application claims priority of Korean Patent Application No. 10-2017-0174067 filed on Dec. 18, 2017, the entire contents of which is incorporated herein for all purposes by this reference.

BACKGROUND

Field of the Invention

The present invention relates to a method and a system for diagnosing a failure of a temperature sensor for a fuel cell, and more particularly, to a method and a system for detecting an error in a sensor value within a normal measurement range of a temperature sensor.

Description of the Related Art

Research is being conducted regarding hydrogen fuel cell vehicles using eco-friendly fuel cells as future alternative energy. Fuel cells generate electric energy through an electrochemical reaction using hydrogen as reaction gas. A fuel cell control system includes a fuel cell stack configured to generate electric energy from a chemical reaction to obtain an output from a fuel cell, a hydrogen supply system configured to supply the fuel cell stack with hydrogen as fuel, an air supply system configured to supply the fuel cell stack with air containing oxygen which is an oxidant required for the chemical reaction, and a heat management system configured to release heat which is a byproduct of generation of the electric energy in the fuel cell stack.

Specifically, the heat management system optimally adjusts an operating temperature of the fuel cell stack to allow the fuel cell stack to be maintained at an appropriate temperature, and to release the heat generated while the fuel cell operates to the outside. A water-cooling type cooling system is generally used in a fuel cell vehicle to cool a fuel cell stack by circulating cooling water through a cooling water channel which is formed at the fuel cell stack. A temperature of a fuel cell stack should be accurately measured to control a heat management system, and reliability in measuring of the temperature of the fuel cell stack should be essentially secured to optimally adjust the temperature of the fuel cell stack.

The temperature of the fuel cell stack may be directly measured inside the fuel cell stack in which a chemical reaction occurs and thus generating heat, and generally, owing to problems such as installation inconvenience and the like, the temperature of the fuel cell stack is estimated from a temperature of cooling water at an inlet or an outlet of the fuel cell stack, or from a temperature of exhaust gas at an outlet of an air supply system for the fuel cell stack. However, when a measured value of a temperature sensor configured to measure a temperature of cooling water or exhaust gas is beyond a normal measurement range, a disconnection or a short circuit may be diagnosed but a failure such as an offset or a fixed measured value, which occurs within the normal measurement range, may be unable to be diagnosed thus decreasing reliability in measurement of a temperature of a fuel cell stack.

The foregoing is intended merely to aid in the understanding of the background of the present invention, and is not intended to mean that the present invention falls within the purview of the related art that is already known to those skilled in the art.

SUMMARY

Accordingly, the present invention provides a method and a system for diagnosing a failure occurring within a normal measurement range using a temperature sensor configured to measure a temperature of a fuel cell stack while operating the fuel cell stack at an appropriate temperature to maintain performance of the fuel cell.

According to one aspect, a method for diagnosing a failure of a temperature sensor for a fuel cell may include calculating a heating value generated at a fuel cell stack during a predetermined diagnosis time, calculating a temperature variation of the fuel cell stack from the calculated heating value, and diagnosing a failure of a temperature sensor configured to measure a temperature of the fuel cell stack based on the calculated temperature variation of the fuel cell stack.

The method may further include, before calculating the heating value of the fuel cell stack, determining whether an initial temperature of the fuel cell stack is able to be assumed as a temperature of outdoor air, wherein, when the initial temperature of the fuel cell stack is able to be assumed as the temperature of the outdoor air, the calculating of the temperature variation of the fuel cell stack includes assuming the temperature of the outdoor air as the initial temperature of the fuel cell stack, and calculating the temperature variation of the fuel cell stack.

The determination of whether the initial temperature of the fuel cell stack is able to be assumed as the temperature of the outdoor air may include determining whether the fuel cell stack is re-operated after an operation of the fuel cell stack is stopped for a predetermined stop time or longer. The calculating of the heating value of the fuel cell stack may include measuring an output voltage and an output current of the fuel cell stack during the predetermined diagnosis time and calculating the heating value of the fuel cell stack based on the measured output voltage and the measured output current.

The calculating of the heating value of the fuel cell stack may include calculating an amount of power of the fuel cell stack during the predetermined diagnosis time and calculating the heating value of the fuel cell stack using a relationship between the amount of power of the fuel cell stack and the heating value thereof. The amount of power of the fuel cell stack may be calculated based on power consumption of a drive motor connected to the fuel cell stack during the predetermined diagnosis time. The calculating of the temperature variation of the fuel cell stack may include calculating the temperature variation of the fuel cell stack from the calculated heating value of the fuel cell stack using predetermined heat capacity of the fuel cell stack.

The method may further include, before diagnosing the failure of the temperature sensor, measuring a temperature of outdoor air. The diagnosis of the failure of the temperature sensor may be performed when the temperature of the outdoor air falls within a predetermined temperature range. The diagnosing of the failure of the temperature sensor may include comparing the calculated temperature variation of the fuel cell stack with a temperature variation measured at the temperature sensor during the predetermined diagnosis time and detecting a failure of the temperature sensor when the comparison result is equal to or greater than a predetermined reference value.

According to another aspect, a system for diagnosing a failure of a temperature sensor for a fuel cell may include a temperature sensor configured to measure a temperature of a fuel cell stack, a fuel cell control unit (FCU) or controller configured to calculate a heating value generated at the fuel cell stack during a predetermined diagnosis time, calculate a temperature variation of the fuel cell stack from the calculated heating value, and diagnose a failure of a temperature sensor configured to measure the temperature of the fuel cell stack based on the calculated temperature variation of the fuel cell stack.

The system may further include a voltage sensor configured to measure an output voltage of the fuel cell stack, and a current sensor configured to measure an output current of the fuel cell stack. The FCU may be configured to calculate the heating value of the fuel cell stack based on the output voltage and the output current of the fuel cell stack, which are measured by the voltage sensor and the current sensor. The system may further include an ambient temperature sensor configured to measure a temperature of outdoor air. The FCU may be configured to detect the failure of the temperature sensor when the temperature of the outdoor air measured at the ambient temperature sensor falls within a predetermined temperature range.

Additionally, the FCU may be configured to measure an operation stop time of the fuel cell stack and calculate the temperature variation of the fuel cell stack by assuming an initial temperature of the fuel cell stack as a temperature of outdoor air when the measured operation stop time is equal to or greater than a predetermined stop time. The FCU may then be configured to compare the calculated temperature variation of the fuel cell stack with a temperature variation measured at the temperature sensor during the predetermined diagnosis time in which the heating value of the fuel cell stack is calculated and detect a failure of the temperature sensor when the comparison result is equal to or greater than a predetermined reference value.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
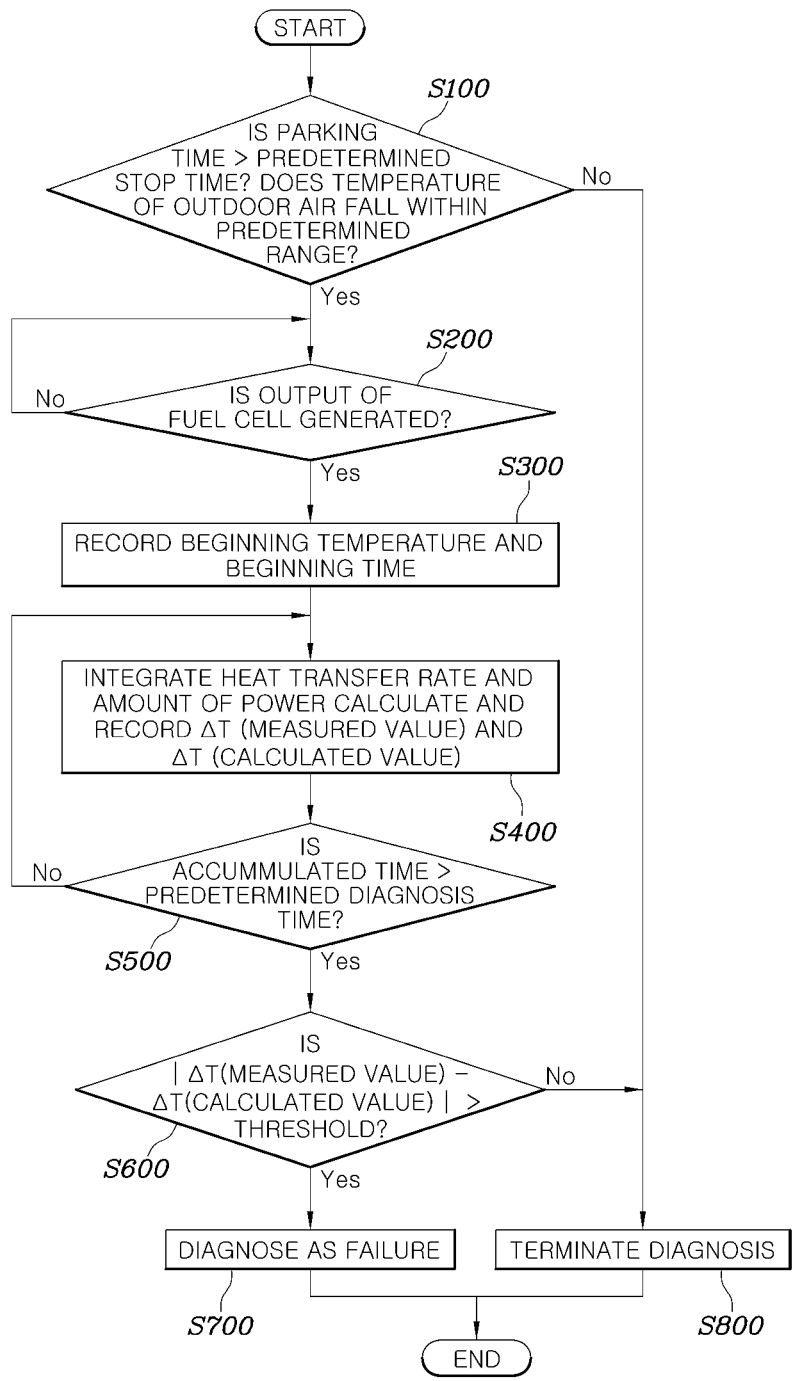
FIG. 1 is a flowchart illustrating a method for diagnosing a failure of a temperature sensor for a fuel cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of the exemplary embodiments of the present invention disclosed in this disclosure or application are illustrative only for the purpose of describing the exemplary embodiments, and the exemplary embodiments according to the present invention may be implemented in various forms and should not be construed as being limited to exemplary embodiments described in this disclosure or application.

The exemplary embodiments according to the present invention may be variously modified and may have various forms, so that specific embodiments will be illustrated in the drawings and be described in detail in this disclosure or application. It should be understood, however, that it is not intended to limit the exemplary embodiments according to the concept of the present invention to specific disclosure forms, but it includes all modifications, equivalents, and alternatives falling within the spirit and scope of the present invention.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present invention.

When a component is referred to as being "connected," or "coupled" to other component, it may be directly connected or coupled to the other component, but it should be understood that another component may exist between the component and the other component. Contrarily, when a component is referred to as being "directly connected," or "directly coupled" to other component, it should be understood that another component may be absent between the component and the other component. Other expressions describing the relationship between components, that is, "between" and "immediately between," or "adjacent to" and "directly adjacent to" should also be construed as described above. Terms used herein is used only for the purpose of describing specific embodiments and are not intended to limit the present invention. Unless the context clearly dictates otherwise, the singular form includes the plural form.

Unless defined otherwise, all terms including technical or scientific terms used herein have the same meaning as commonly understood by those skill in the art to which the present invention pertains. General terms that are defined in a dictionary shall be construed to have meanings that are consistent in the context of the relevant art and will not be interpreted as having an idealistic or excessively formalistic meaning unless clearly defined in the present disclosure.

Hereinafter, exemplary embodiments of the present invention will be described in detail with reference to the accompanying drawings. Like reference numerals denote like members throughout the drawings.

FIG. 1 is a flowchart illustrating a method for diagnosing a failure of a temperature sensor for a fuel cell according to an exemplary embodiment of the present invention. The method described herein below may be executed by a controller having a processor and a memory. Referring to FIG. 1, the method for diagnosing a failure of a temperature sensor for a fuel cell according to an exemplary embodiment of the present invention may include calculating a heating value generated at a fuel cell stack for a predetermined diagnosis time (S400), calculating a temperature variation of the fuel cell stack from the calculated heating value (S400), and diagnosing a failure of a temperature sensor configured to measure a temperature of the fuel cell stack based on the calculated temperature variation of the fuel cell stack (S600).

The temperature sensor may be configured to measure a temperature of a reaction portion disposed inside the fuel cell stack, and the temperature sensor may be disposed at the reaction portion inside the fuel cell stack to directly measure the temperature of the reaction portion. However, owing to a problem such as installation inconvenience or a layout, a method is generally used that estimates a temperature of the fuel cell stack by measuring a temperature of an outlet of cooling water passing through the fuel cell stack or a temperature of an outlet of an air supply system. In other words, the temperature sensor for a fuel cell according to the present invention may be a sensor disposed at a flow path of the cooling water passing through the fuel cell stack or at a flow path of exhaust gas discharged from the fuel cell stack and configured to measure a temperature of the cooling water or the exhaust gas.

Before calculating the heating value of the fuel cell stack (S400), the method may include determining whether an initial temperature of the fuel cell stack is assumed as a temperature of outdoor air (S100), and, when the initial temperature of the fuel cell stack is determined to be assumed as the temperature of the outdoor air, the calculating of the temperature variation of the fuel cell stack (S400) may include assuming the temperature of the outdoor air as the initial temperature of the fuel cell stack and calculating the temperature variation of the fuel cell stack.

The determination as to whether the initial temperature of the fuel cell stack is assumed as the temperature of the outdoor air (S100) may include determining whether a fuel cell is re-operated after being stopped for longer than a predetermined stop time. The operation stop of the fuel cell may refer to an idle mode in which power generation of the fuel cell is no longer required while a fuel cell vehicle is being driven. However, since a substantial period of time may be required to assume the initial temperature of the fuel cell stack as the temperature of the outdoor air, whether a parking time of the fuel cell vehicle is equal to or greater than a predetermined stop time of the fuel cell may be determined using a parking record. In other words, a time at which point the vehicle was parked may be recorded in a database.

When the fuel cell is maintained in a stop state for a substantial period of time, the temperatures of the fuel cell stack, the cooling water, and the like may be assumed to converge with the temperature of the outdoor air (e.g., the temperatures may be assumed to now correspond to the outdoor temperature). In other words, when a stop time of the fuel cell is equal to or greater than the predetermined stop time (e.g., about 24 hours or longer), the temperature of the fuel cell stack may be assumed to be equal to the temperature of the outdoor air. When the fuel cell is re-operated in a state in which the fuel cell is maintained in the stop state for a substantial period of time and thus the temperature of the fuel cell stack is converged with the temperature of the outdoor air, cold starting control may be performed to increase the temperature of the fuel cell stack until the temperature of the fuel cell stack reaches a normal operating temperature. The normal operation temperature of the fuel cell stack may be in the range of about 50 to 80° C. The cold starting control may be performed until the temperature of the fuel cell stack becomes 0° C., a temperature at which the frozen ice in the fuel cell melts. In addition, an additional waiting time or an additional temperature may be added in determining the termination condition of the cold starting control to assure that all the frozen ice in the fuel cell has melted.

In the cold starting control, a pump configured to circulate the cooling water may not be operated or may be operated at a minimum revolutions per minute (RPM), alternately, the cooling water passing through the fuel cell stack may be blocked from flowing to a radiator through a thermostat or a three-way valve disposed at the flow path of the cooling water. Accordingly, a relationship between the heating value of the fuel cell stack and the temperature variation thereof, which will be described below, may be applied more accurately. Therefore, a predetermined diagnosis time may be appropriately set as a time from when the fuel cell is re-operated before the cold starting control is terminated.

Prior to diagnosing the failure of the temperature sensor (S600), the method may include measuring a temperature of an outdoor air (S100) (e.g., the air outside of the vehicle). When the temperature of the outdoor air is within a predetermined temperature range, the failure of the temperature sensor may be diagnosed. An ambient temperature sensor may be configured to measure a temperature of an outdoor air, and when the temperature of the outdoor air measured by the ambient temperature sensor is within a predetermined temperature range (e.g., in a range of about 15 to 30° C.), the failure of the temperature sensor may be diagnosed.

However, when the temperature of the outdoor air is less than or greater than the predetermined temperature range, the relationship between the heating value of the fuel cell and the temperature variation thereof may be significantly affected by conduction and convection to the outside, and thus, the failure of the temperature sensor may be appropriately diagnosed in a limited temperature range of the outdoor air (e.g., in a range of about 15 to 30° C.). Therefore, to prevent the relationship between the heating value of the fuel cell and the temperature variation thereof from being significantly affected by conduction and convection to the outside, the failure of the temperature sensor may be diagnosed within the predetermined temperature range to thus improve accuracy and reliability in the diagnosis of the failure of the temperature sensor.

Furthermore, when the parking time of the fuel cell vehicle is less than the predetermined stop time of the fuel cell, or the temperature of the outdoor air is outside of the predetermined temperature range, the diagnosing of the failure of the temperature sensor for a fuel cell (S800) may be stopped and a diagnosis control may be terminated. Additionally, prior to calculating the heating value of the fuel cell stack (S400), the method may include determining whether power is generated from the fuel cell stack (S200). In particular, heat is generated when the fuel cell is re-operated to generate power. When the power of the fuel cell stack is generated thus causing heat to be generated from the fuel cell stack, a predetermined diagnosis time may begin and a fuel cell control unit (FCU) may be configured to record a temperature and a time at the beginning of the diagnosis time (S300). In other words, the controller (e.g., FCU) may be configured to store the temperature and time in a database. The temperature at the beginning of the diagnosis time may be the temperature of the outdoor air according to the result of the determining whether the initial temperature of the fuel cell stack is assumed as the temperature of the outdoor air (S100).

Thereafter, the heating value of the fuel cell stack (S400) may be calculated. For example, the calculating of the heating value of the fuel cell stack (S400) may include measuring an output voltage and an output current of the fuel cell stack during the predetermined diagnosis time and calculating the heating value of the fuel cell stack based on the measured output voltage and the measured output current. Specifically, the following equation may be used.

$$Q = \int \{Ifc*(Vth-Vfc)*n\}dt$$

wherein, Q is the heating value of the fuel cell stack, Ifc is a cell current of the fuel cell, Vth is a thermodynamic voltage of a fuel cell reaction, Vfc is a cell voltage of the fuel cell, and n is the number of the fuel cells.

The output voltage and the output current of the fuel cell may be measured by a voltage sensor configured to measure a cell voltage and a current sensor disposed at a terminal side of the fuel cell and configured to measure the output current of the fuel cell. The voltage sensor and the current sensor may be disposed within the fuel cell stack, and thus the heating value of the fuel cell stack may be calculated during the predetermined diagnosis time using the above-described equation.

Further, the thermodynamic voltage Vth of the fuel cell reaction is a voltage for calculating thermodynamically available maximum energy, and the thermodynamic voltage Vth may be equal to an open circuit voltage (OCV) which is a voltage in a state in which the fuel cell does not emit a current to the outside. The OCV of a unit cell may be about 1.2 V. In other words, the heating value of the fuel cell may be calculated by thermodynamically assuming that a value obtained by subtracting output energy (Ifc*Vfc) of the fuel cell from reaction energy (Ifc*Vth) of hydrogen is the heating value of the fuel cell. Alternatively, the reaction energy of hydrogen may be calculated from an amount of reacted hydrogen. As another example, the calculating of the heating value of the fuel cell stack (S400) may include calculating an amount of power of the fuel cell stack during the predetermined diagnosis time and calculating the heating value of the fuel cell stack using a relationship between the amount of power of the fuel cell stack and the heating value thereof.

Figure 3:
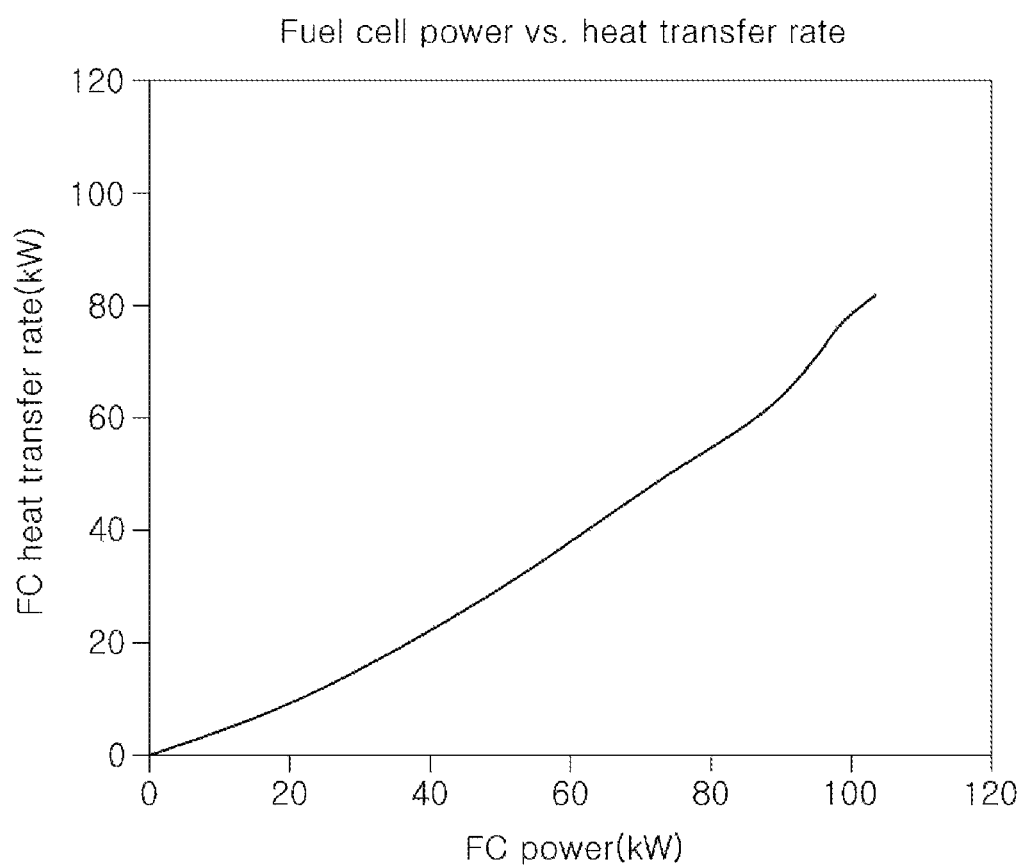
FIG. 3 is a graph illustrating a relationship between power of a fuel cell and a heat transfer rate thereof according to an exemplary embodiment of the present invention.

FIG. 3 is a graph illustrating a relationship between power of a fuel cell and a heat transfer rate thereof according to an exemplary embodiment of the present invention. As shown in FIG. 3, the power of the fuel cell and the heat generation rate thereof may be directly proportional to each other. Generally, efficiency of the fuel cell (power/(power+heat transfer rate)) may be calculated in a range of about 50% to 65%. When assuming that the efficiency of the fuel cell is about 50%, the heat transfer rate of the fuel cell may be equal to the power of the fuel cell (heat transfer rate=1*power), and, when assuming that the efficiency of the fuel cell is about 65%, the heat transfer rate of the fuel cell may be about 54% of the power of the fuel cell (heat transfer rate=0.54*power).

Therefore, a direct proportional relationship between an amount of power which is an integral value of the power, and the heating value which is an integral value of the heat transfer rate may be derived using the relationship between the power and the heat transfer rate of the fuel cell in consideration of the efficiency of the fuel cell, and thus, the heating value of the fuel cell stack may be calculated through the amount of power of the fuel cell.

Further, an amount of power of the fuel cell stack may be calculated based on power consumption of a drive motor, which is connected to the fuel cell stack, during the predetermined diagnosis time. In other words, the power consumption of the drive motor, which is connected to the fuel cell stack via a main bus terminal, during the predetermined diagnosis time may be calculated, and the amount of power of the fuel cell stack may be calculated by multiplying a predetermined weight value to the power consumption of the drive motor. The power consumption of the drive motor may be calculated by a function including factors such as a torque of the drive motor, the number of revolutions thereof, and the like.

However, although a method for calculating the heating value of the fuel cell stack using the relationship between the amount of power of the fuel cell stack and the heating value thereof is simple, a high voltage battery that is an auxiliary power source is generally included in the fuel cell vehicle. Therefore, a relationship between the power consumption of the drive motor and the amount of power of the fuel cell stack may be varied based on the charging or discharging of the high voltage battery, and, even when the drive motor performs regenerative braking, an error may occur and an unexpected error may occur due to peripheral power consumption sources such as an auxiliary machinery and the like.

Therefore, to improve reliability of the heating value of the fuel cell stack calculated based on the measured output voltage and the measured output current, the method for calculating the heating value of the fuel cell stack using the relationship between the amount of power of the fuel cell stack and the heating value thereof may be used as a method for verifying whether the calculated heating value of the fuel cell stack falls within an appropriate range. The calculating of the temperature variation of the fuel cell stack (S400) may include calculating the temperature variation of the fuel cell stack from the calculated heating value of the fuel cell stack using predetermined heat capacity of the fuel cell. The following equation may be used according to the thermodynamic law.

$$Q = Cfc * \Delta T$$

wherein, Q is the heating value of fuel cell stack, Cfc is the heat capacity of the fuel cell, and $\Delta T$ is the temperature variation.

The heating value Q of the fuel cell stack may refer to a heating value of the fuel cell stack during the predetermined diagnosis time, and the heat capacity Cfc of the fuel cell may be preset in consideration of the fuel cell stack and the cooling water included in the fuel cell stack. The temperature variation of the fuel cell stack may be calculated from the calculated heating value of the fuel cell stack during the predetermined diagnosis time using the above-described equation.

Additionally, the method may include determining whether an accumulated time from a time when the diagnosis of the temperature sensor begins exceeds the predetermined diagnosis time (S500). The diagnosing of the failure of the temperature sensor (S600) may include measuring a temperature of the fuel cell stack based on the calculated temperature variation of the fuel cell stack while the accumulated time exceeds the predetermined diagnosis time. Instead of the determining whether the accumulated time from the time when the diagnosis of the temperature sensor begins exceeds the predetermined diagnosis time (S500), the method may include determining whether the heating value of the fuel cell stack is greater than a predetermined heating value or whether the amount of power of the fuel cell stack is greater than a predetermined amount of power to thus determine whether the temperature variation of the fuel cell stack is sufficient to compare with a predetermined reference value.

In particular, the diagnosing of the failure of the temperature sensor (S600) including the measuring of the temperature of the fuel cell stack based on the calculated temperature variation of the fuel cell stack may include comparing the calculated temperature variation of the fuel cell stack with a temperature variation measured at the temperature sensor during the predetermined diagnosis time in which the heating value of the fuel cell stack is calculated, and diagnosing the temperature sensor as failing when the comparison result is greater than a predetermined reference value (S700). In other words, when $|\Delta T|$ (the measured temperature variation)-$\Delta T$ (the calculated temperature variation) is greater than the predetermined reference value, the temperature sensor may be diagnosed as failing (S700). Particularly, $\Delta T$ (the measured temperature variation) is a temperature variation measured at the temperature sensor before and after the predetermined diagnosis time, and $\Delta T$ (the calculated temperature variation) is a temperature variation of the fuel cell stack calculated based on the calculated heating value of the fuel cell stack.

However, when $|\Delta T|$ (the measured temperature variation)-$\Delta T$ (the calculated temperature variation) is less than the predetermined reference value, the temperature sensor may be diagnosed as not failing, and thus the temperature sensor may be determined to normally sense the temperature and thus, the diagnosis may be terminated (S800). Consequently, the failure of the temperature sensor may be diagnosed by comparing the temperature variation, which is measured at the temperature sensor configured to measure a temperature of the fuel cell stack during the predetermined diagnosis time, with the temperature variation of the fuel cell stack calculated using the heating value of the fuel cell stack.

Figure 2:
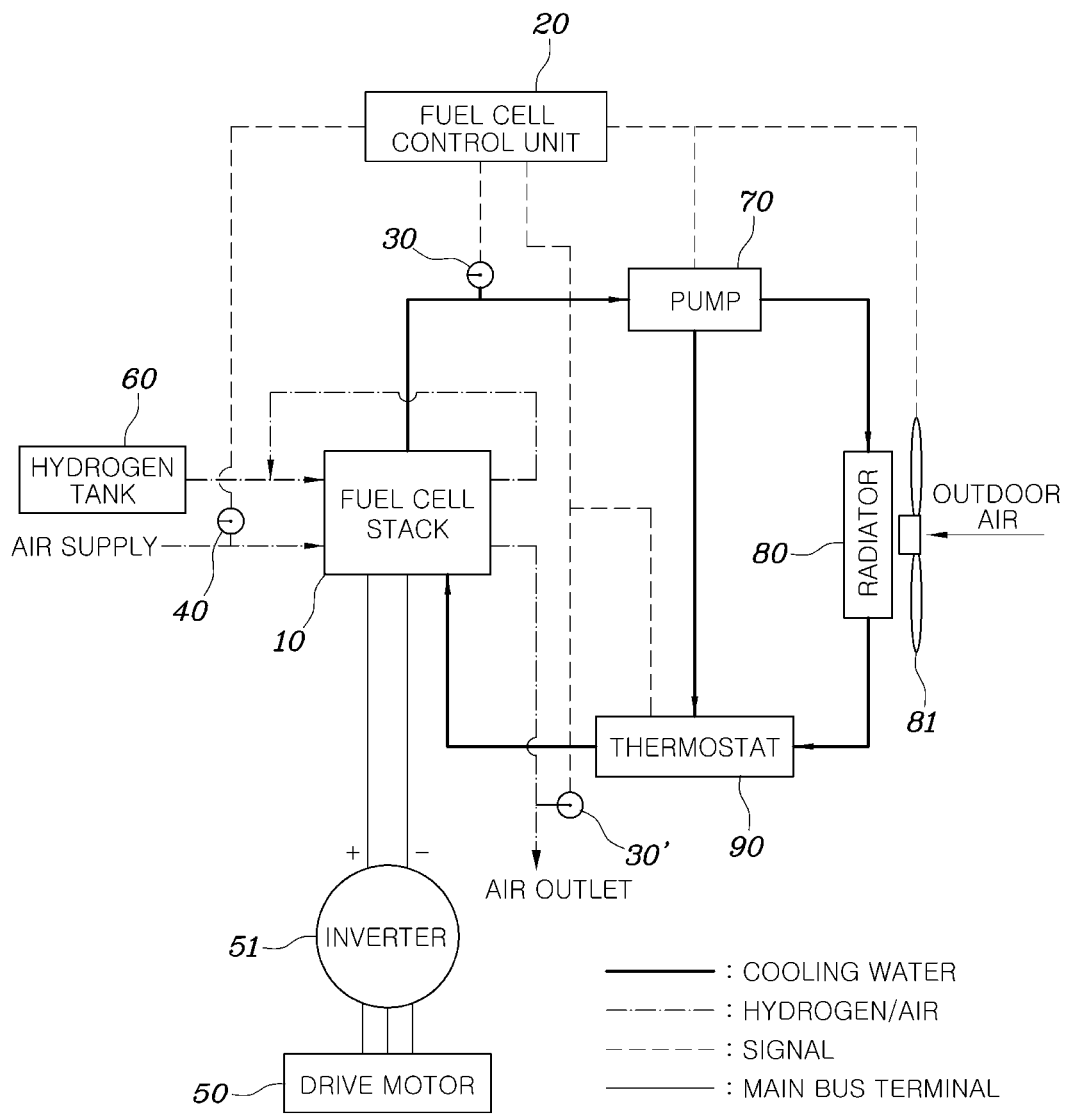
FIG. 2 is a configurational diagram illustrating a system for diagnosing a failure of a temperature sensor for a fuel cell according to an exemplary embodiment of the present invention.

FIG. 2 is a configurational diagram illustrating a system for diagnosing a failure of a temperature sensor for a fuel cell according to an exemplary embodiment of the present invention. Referring to FIG. 2, the system for diagnosing a failure of a temperature sensor for a fuel cell according to an exemplary embodiment of the present invention may include temperature sensors 30 and 30' configured to measure a temperature of a fuel cell stack 10, and a fuel cell control unit (FCU) 20 or controller configured to calculate a heating value generated at the fuel cell stack 10 during a predetermined diagnosis time, calculate a temperature variation of the fuel cell stack 10 based on the calculated heating value, measure a temperature of the fuel cell stack 10 based on the calculated temperature variation of the fuel cell stack 10, and diagnose a failure of the temperature sensors 30 and 30'.

The temperature sensor 30 may be disposed at a flow path of cooling water to measure a temperature of the cooling water passing through the fuel cell stack 10, and the temperature sensor 30' may be disposed at an outlet side of an air supply line to measure a temperature of exhaust gas passing through the fuel cell stack 10. The temperature sensors 30 and 30' may be configured to measure the temperatures of the cooling water and the exhaust gas, and the FCU 20 may be configured to estimate the temperature of the fuel cell stack 10 using the measured temperature of the cooling water or the exhaust gas. The FCU 20 may be a controller configured to operate overall devices such as an air supply system, a heat management system, and a hydrogen supply system which are disposed around the fuel cell stack 10.

In particular, a hydrogen tank 60 of the hydrogen supply system may be configured to supply hydrogen to the fuel cell stack 10, and air may be supplied to the fuel cell stack 10 from an air inlet and may be discharged to an air outlet. The heat management system may be a water-cooling type system using the cooling water and may include a pump 70 configured to circulate the cooling water, a radiator 80 configured to release heat, a fan 81 configured to guide outdoor air into the radiator 80, and a thermostat 90 configured to adjust a route of the flow path of the cooling water.

A direct current output from the fuel cell stack 10 may be converted into an alternating current by an inverter 51 and may be supplied to a drive motor 50. Although not shown in the drawing, a high voltage battery and an auxiliary machinery may also be included. A voltage sensor (not shown) configured to measure an output voltage of the fuel cell stack 10 and a current sensor (not shown) configured to measure an output current of the fuel cell stack 10 may further be included. The FCU 20 may be configured to calculate the heating value of the fuel cell stack 10 based on the output voltage and the output current measured at the voltage sensor and the current sensor.

The voltage sensor (not shown) and the current sensor (not shown) may be configured to measure an entire output voltage and an entire output current output from the fuel cell stack 10 via a main bus terminal (not shown), and alternatively, the voltage sensor and the current sensor may be configured to measure an output voltage and an output current of each cell inside the fuel cell stack 10 to calculate the entire output voltage and the entire output current of the fuel cell stack 10. An ambient temperature sensor 40 configured to a temperature of the outdoor air may further be included, and the FCU 20 may be configured to diagnose a failure of the temperature sensors 30 and 30' when the temperature of the outdoor air measured at the ambient temperature sensor 40 falls within a predetermined temperature range.

The ambient temperature sensor 40 may be disposed at the air inlet of the air supply system to measure the temperature of the outdoor air. Alternatively, the ambient temperature sensor 40 may be configured to measure a temperature of air flowing into the radiator 80, or the ambient temperature sensor 40 may be disposed at the outside of a fuel cell vehicle to measure the temperature of the outdoor air. The FCU 20 may be configured to measure an operation stop time of the fuel cell stack 10 and calculate the temperature variation of the fuel cell stack 10 by assuming an initial temperature of the fuel cell stack 10 as the temperature of the outdoor air when the measured operation stop time is equal to or greater than a predetermined stop time.

Additionally, the FCU 20 may be configured to compare the calculated temperature variation of the fuel cell stack 10 with the temperature variation measured at the temperature sensors 30 and 30' during the predetermined diagnosis time in which the heating value of the fuel cell stack 10 is calculated. When the comparison result is greater than a predetermined reference value, the FCU 20 may be configured to detect a failure of the temperature sensors 30 and 30'. A detailed description of the system for diagnosing a failure of a temperature sensor for a fuel cell overlapping with that of the method for diagnosing a failure of a temperature sensor for a fuel cell will be omitted.

When the temperature sensor for a fuel cell is determined as failing, the FCU may be configured to output a notification to a driver regarding the failure of the temperature sensor using a warning lamp and the like at a cluster for a vehicle. It can be a warning to make the driver do maintenance. Also, the FCU may perform a Fail-Safe operation. For example, the output power of the fuel cell may be limited when the fuel cell can be overheated or overcooled. Due to the limitation of the power, it is possible to prevent damage to the fuel cell due to overheating or defective supply of reaction gas due to excess water generated during overcooling.

Further, when the temperature sensor for a fuel cell fails, the temperature of the fuel cell stack measured at the temperature sensor may be unreliable, and thus, the temperature of the fuel cell stack may be estimated from the heating value of the fuel cell stack and may be used for temperature control of the fuel cell stack. In particular, the temperature control of the fuel cell stack may include operating a cooling water pump included in a cooling water circulation system, a valve for bypassing the flow path of the cooling water, and the like, and the FCU may be configured to adjust the temperature of the fuel cell stack using an estimated temperature of the fuel cell stack from the heating value of the fuel cell stack. An alternative sensor value that indirectly estimates the temperature of the fuel cell can be used. For example, when the coolant temperature sensor fails, the temperature value of the air outlet gas is used as the coolant temperature substitute value to perform the cooling system control function. Alternative sensor values may be used when used in a one-to-one manner, or they may reflect offsets calculated from the heat output from the fuel cell output.

Additionally, whether the temperature measured at the temperature sensor for a fuel cell is diagnosed as having an offset by a predetermined temperature from an actual temperature of the fuel cell stack temperature may be determined, and thus an error of the temperature measured at the temperature sensor for a fuel cell may be corrected and used as the temperature of the fuel cell stack. The fuel cell may thus be operated according to the corrected temperature.

In accordance with the method and the system for diagnosing a failure of a temperature sensor for a fuel cell, a failure of a temperature sensor may be detected due to a disconnection or a short circuit as well as a failure in which an incorrect temperature is measured within a normal measurement range. Further, reliability of a temperature value measured at the temperature sensor for a fuel cell may be secured. The fuel cell may be operated to be maintained at an appropriate temperature based on an accurate temperature measurement to thereby maintain performance to thus improve durability and power generation efficiency of the fuel cell.

Although exemplary embodiments of the present invention have been described and illustrated, those skilled in the art will appreciate that various alternations and modifications are possible without departing from the technical spirit of the present invention as disclosed in the appended claims.

What is claimed is:

1. A method for diagnosing a failure of a temperature sensor for a fuel cell, comprising:
    measuring a temperature of an outdoor air of a vehicle wherein the temperature of the outdoor air is within a predetermined temperature range, is determined to diagnose the failure of the temperature sensor by using the temperature of the outside air;
    calculating, by a controller, a heating value generated at a fuel cell stack during a predetermined diagnosis time;
    calculating, by the controller, a temperature variation of the fuel cell stack from the calculated heating value; and
    diagnosing, by the controller, the failure of the temperature sensor configured to measure a temperature of the fuel cell stack based on the calculated temperature variation of the fuel cell stack,
    wherein the calculating of the heating value of the fuel cell stack includes:
    calculating, by the controller, an amount of power of the fuel cell stack during the predetermined diagnosis time; and
    calculating, by the controller, the heating value of the fuel cell stack using a relationship between the amount of power of the fuel cell stack and the heating value thereof, and
    wherein the amount of power of the fuel cell stack is calculated by multiplying a power consumption of a drive motor connected to the fuel cell stack by a weighting factor during the predetermined diagnosis time to account for at least one of a high voltage battery or an auxiliary power source;
    wherein the calculating of the temperature variation of the fuel cell stack includes:
    calculating, by the controller, the temperature variation of the fuel cell stack from the calculated heating value of the fuel cell stack using predetermined heat capacity of the fuel cell stack.

2. The method of claim 1, further comprising:
before calculating the heating value of the fuel cell stack, determining, by the controller, whether an initial temperature of the fuel cell stack is able to be assumed as the temperature of the outdoor air,
wherein, when the initial temperature of the fuel cell stack is able to be assumed as the temperature of the outdoor air, the calculating of the temperature variation of the fuel cell stack includes assuming the temperature of the outdoor air as the initial temperature of the fuel cell stack and calculating the temperature variation of the fuel cell stack.

3. The method of claim 2, wherein the determining of whether the initial temperature of the fuel cell stack is able to be assumed as the temperature of the outdoor air includes determining whether the fuel cell stack is re-operated after an operation of the fuel cell stack is stopped for a predetermined stop time or longer.

4. The method of claim 1, wherein the calculating of the heating value of the fuel cell stack includes:
measuring, by the controller, an output voltage and an output current of the fuel cell stack during the predetermined diagnosis time; and
calculating, by the controller, the heating value of the fuel cell stack based on the measured output voltage and the measured output current.

5. The method of claim 1, wherein the diagnosing of the failure of the temperature sensor includes:
comparing, by the controller, the calculated temperature variation of the fuel cell stack with a temperature variation measured at the temperature sensor during the predetermined diagnosis time; and
diagnosing, by the controller, the temperature sensor as failing when the comparison result is equal to or greater than a predetermined reference value.

* * * * *